United States Patent [19]
Wood et al.

[11] Patent Number: 5,901,368
[45] Date of Patent: May 4, 1999

[54] RADIOLYSIS-ASSISTED DECONTAMINATION PROCESS

[75] Inventors: Christopher J. Wood, Mountain View, Calif.; David Bradbury, Wotton-under-Edge; George Richard Elder, Westbury-on-Severn, both of United Kingdom

[73] Assignee: Electric Power Research Institute, Palo Alto, Calif.

[21] Appl. No.: 08/868,500

[22] Filed: Jun. 4, 1997

[51] Int. Cl.$^6$ ........................................ G21F 9/00
[52] U.S. Cl. .................. 588/20; 134/10; 210/749; 376/310; 376/313; 976/DIG. 379
[58] Field of Search .................. 588/20; 134/1, 134/10; 210/749; 376/310, 313; 976/DIG. 379

[56] References Cited

U.S. PATENT DOCUMENTS

| | | | |
|---|---|---|---|
| Re. 34,613 | 5/1994 | Hanulik | 252/628 |
| 4,162,229 | 7/1979 | Loewenschuss | 252/301.1 |
| 4,175,011 | 11/1979 | Spiliotis | 204/15 |
| 4,470,951 | 9/1984 | Bradbury et al. | 376/310 |
| 4,705,573 | 11/1987 | Wood et al. | 134/3 |
| 4,731,124 | 3/1988 | Bradbury et al. | 134/3 |
| 4,915,781 | 4/1990 | Bohnen et al. | 156/664 |
| 5,078,842 | 1/1992 | Wood et al. | 204/1.5 |
| 5,132,076 | 7/1992 | Corpora et al. | 376/310 |
| 5,171,519 | 12/1992 | Corpora et al. | 376/310 |
| 5,305,360 | 4/1994 | Remark et al | 376/309 |
| 5,306,399 | 4/1994 | Bradbury et al. | 204/1.5 |
| 5,340,505 | 8/1994 | Hanulik et al. | 588/18 |
| 5,517,539 | 5/1996 | Corpora et al. | 376/310 |
| 5,520,813 | 5/1996 | Korin et al. | 210/638 |
| 5,564,105 | 10/1996 | Alvino et al. | 588/20 |
| 5,724,668 | 3/1998 | Wood et al. | 588/1 |

FOREIGN PATENT DOCUMENTS

| | | |
|---|---|---|
| 0 483 053 A1 | 9/1991 | European Pat. Off. |
| WO 85/04279 | 2/1985 | WIPO |

OTHER PUBLICATIONS

Allen, Geoffrey, C.; Kirby, Colin; and Sellers, Robin, M.,The Effect of the Low–oxidation–state Metal Ion Reagent Tris–picolinatovanadium (II) Formate on the Surface Morphology and Composition of Crystalline Iron Oxides, *J. Chem. Soc.*, Faraday Trans. 1, 1988, 84(1), 355–364.

Suwa, Takeshi; Kuribayashi, Nobuhide; and Tachikawa, Enzo, Development of Chemical Decontamination Process with Sulfuric Acid–Cerium (IV) for Decommissioning, *Journal of Nuclear Science and Technology*, vol. 25, No. 7, pp. 574–585, Jul. 1988.

Pettit, P.J.; LeSurf, J. E.; Stewart, W. B.; Strickert, R. J.; and Vaughan, S. B., Decontamination of the Douglas Point Reactor by the Can–Decon Process, The International Corrosion Forum Devoted Exclusively to the Protection and Performance of Materials, Paper No. 39, Mar. 6–10, 1978.

1988 JAIF International Conference on Water Chemistry in Nuclear Power Plants—Operational Experience and New Technologies for Management, Proceedings vol. 2, Apr. 19–22, 1988.

Full System Chemical Decontamination Workshop, Proceedings, Jun. 4–5, 1991.

Waste Processing, Transportation, Storage and Disposal, Technical Programs and Public Education; vol. 1—Low––Level Waste, 1988.

Bishop, J. V.; Dutcher, R. A.; Fisher, M. S.; Kottle, S.; and Stowe, R. A., *Continuous Spectrographic Analysis of Vanadous and Vanadic Ions*, Oct. 31, 1993.

*Carbon Steel and Related Alloy Corrosion in LOMI Decontamination Solvents*.

Johnson, Jr., A. B.; and Battelle, B. Griggs,*Investigation of Chemicals and Methods of Dilute Reagent Decontamination for Potential Application in Light Water Reactors*, 1978.

Makai, J. et al., *Investigation of V(II) and Cr(II) Compounds for Cleaning of Steam Generators at Paks Nuclear Power Plant Ltd.*

Central Electricity Generating Board, *Development of LOMI Chemical Decontamination Technology*, Jul. 1983.

*Primary Examiner*—Ngoclan Mai
*Attorney, Agent, or Firm*—Dergosits & Noah, LLP

[57] ABSTRACT

A method for minimizing the radioactive waste produced by decontamination processes for water-cooled nuclear reactors. The method exposes the decontamination chemicals to the ionizing radiation emitted from the reactor fuel under controlled conditions to convert the decontamination chemicals into harmless gas phase products.

15 Claims, No Drawings

RADIOLYSIS-ASSISTED DECONTAMINATION PROCESS

TECHNICAL FIELD

This invention relates to the field of decontamination methods for water-cooled nuclear reactors. More particularly, this invention relates to the use of ionizing radiation to convert chemicals used in a decontamination process into nonradioactive gas phase products for the purpose of minimizing radioactive waste.

BACKGROUND OF THE INVENTION

Decontaminating Light Water Reactor (LWR) plant subsystems have become relatively common in the United States and are widely recognized as a useful contributor to the reduction of radiation exposure at these plants. Subsystem decontamination involves exposing a part of the reactor circuit to chemical solutions to dissolve the radioactive deposits that have accumulated on the surfaces of the process equipment, including piping. The spent decontamination solutions are then treated by ion exchange to retain all the chemical and radioactive burden of the decontamination solution on the resin, while clean water is returned to the system. An example of such a process is the Low Oxidation-state Metal Ion reagents (LOMI) process, described in U.S. Pat. No. 4,705,573, hereby incorporated by reference.

The LOMI process removes deposits consisting essentially of the oxides of one or more transition metals from a surface. The process comprises the steps of contacting the surface, at a pH in the range of 2.0 to 7.0, with a reagent comprising a one-electron reducing agent. The reducing agent is the complex formed between a low oxidation state transition metal ion and a complexing agent, for destabilizing the metal oxides deposited, thereby increasing their rate of dissolution. The complexing agent is thermally stable at the operating pH and present in order to form the necessary complex reagent and also to increase the thermodynamic solubility of the metal ions released.

Decontamination processes of the type described above can also be applied to the whole of the reactor circuit (including the reactor core) in the absence of the fuel. This is sometimes called "Full System Decontamination." There are examples of this type of operation described in the literature such as the decontamination of the Indian Point 2 PWR in March 1995. See, Parry, J. O., Trovato, S. A., "National Demonstration of Full Reactor Coolant System (RCS) Chemical Decontamination—Post Decon. " EPRI Radiation Field Control & Chemical Decontamination Seminar, Tampa, Fla., Nov. 6–8, 1995. The only major differences between this type of operation and the sub-system decontamination described in the previous paragraph are the greater extent of the reactor systems exposed to the decontamination solution, and the use of the reactor coolant pumps to circulate the decontamination solution. This provides higher flow velocity and improved contact between the reactor surfaces and the decontamination solution. The main advantages of this type of operation compared with the traditional sub-system decontamination processes are the reduction of radiation dose rates in many different plant locations and the removal of radioactive material from the reactor core. This radioactive material would otherwise be available to re-contaminate the circuit, and thus the benefits of the decontamination continue to be gained in later maintenance outages after further periods of operation. The plant systems can be used to circulate the decontamination reagent, to control its temperature and possibly even to effect solution clean-up and therefore require less temporary equipment to carry out the decontamination. The main disadvantages of this type of full system decontamination are the large volume of radioactive waste ion exchange resin generated and the time required to unload the fuel from the reactor.

However, the fuel does not necessarily need to be unloaded from the reactor core prior to full system decontamination. The principal reasons for unloading the fuel before the decontamination process are concerns that the fuel might be damaged by the decontamination process and that the radiation from the fuel might degrade the decontamination reagent. Unfortunately, as stated previously, the removal of the fuel from the reactor takes significant time which, if it is on the "critical path" of the maintenance outage, can make the decontamination process noneconomical. If it were possible to leave the fuel in place, the decontamination could be done during the period immediately following reactor shut down, but before the reactor vessel head is removed. In this way, the time penalty can be avoided or at least minimized.

Referring to the "fuel-in" disadvantages above, concerns about the exposure of the fuel to the decontamination solution can usually be overcome, since the decontamination solutions are designed to be compatible with the fuel materials. There are many reports of the successful exposure of nuclear fuel elements to the decontamination reagent systems typically employed, and there are reports of typical decontamination processes becoming satisfactorily qualified for exposure to fuel elements. See Miller, P. E., "Fuel-In Full RCS Chemical Decontamination Qualification Program," EPRI Radiation Field Control & Chemical Decontamination Seminar, Tampa, Fla., Nov. 6–8, 1995. The extra radioactive material removed may cause some difficulties in waste management, but the purpose of decontamination is to remove radioactive material from the reactor coolant circuit, and the extra radioactive material removed by cleaning the fuel may in fact be an advantage. The final potential disadvantage of fuel-in decontamination, namely the exposure of the decontamination reagent to the radiation dose from the fuel, has been discussed in many reports, but has not previously been seen as a critical disadvantage. There are reports of successful full system decontaminations of reactors with fuel in place, in Canada (see Speranzini, R. A., Lister, D. H., "Canadian Experience with Full System Decontamination," 3rd EPRI Seminar on Chemical Decontamination of BWRs, Charlotte, N.C., 1988), in England (see Nash, G. J. C., "Decontamination of the SGHWR Prototype," Conference on Water Chemistry of Nuclear Reactor Systems. British Nuclear Energy Society, UK, 1977. Paper No: 45) and elsewhere.

It should further be noted that radiation can cause degradation of organic chemical reagents used for decontamination. In consideration of the behavior of the decontamination reagents in the presence of high radiation dose rates, the usual approach has been to apply the decontamination process in such a way that the radiation dose rates are not sufficient to cause significant decomposition. Alternatively, it may be accepted that decomposition occurs and the decontamination reagent must be replenished by fresh additions of chemicals during the application of the process.

In studies of the LOMI decontamination process, it was found that the behavior of the decontamination reagent could be controlled in the presence of radiation by converting oxidizing hydroxyl radicals produced by radiolysis into the carbon dioxide radical anion through reaction of the former with formic acid. Not only does this procedure protect the decontamination reagent against radiolytic damage, but the principal active ingredient of the reagent, vanadous picolinate, is formed from the spent reagent by reaction of the latter with the reducing radicals produced in this way. See Bradbury, D., Segal, M. G., Sellers, R. M., Swan, T. & Wood, C. J., "Development of LOMI Chemical Decontamination Technology," EPRI Report NP 3177, 1983.

What is needed is a process for minimizing the radioactive waste produced during the decontamination of nuclear reactors.

SUMMARY OF THE INVENTION

According to the present invention, the decontamination of nuclear reactor circuits is designed to take place under conditions in which the decontamination solution is exposed to sufficient average radiation dose rates to convert specific components of the decontamination chemical solution, typically, the organic chemicals used in the decontamination reagent, to the gas phase once the decontamination is complete. Typically, these conditions occur when decontaminating a water reactor with a pressure vessel (as opposed to a pressure tube) design, wherein the fuel elements are included in the decontamination circuit. This occurs, for example, when the decontamination process is conducted immediately after the reactor has been shut down.

The objects of the present invention are accomplished by providing a method for minimizing radioactive waste produced during decontamination processes performed on radioactively contaminated nuclear reactors wherein the decontamination process includes exposing parts of the nuclear reactor's circuit to a decontamination chemical solution which dissolves radioactive deposits and subsequently treating the decontamination chemical solution by ion exchange. The decontamination chemical solution containing the dissolved radioactive deposits is then exposed to ionizing radiation having an average radiation dose rate of at least 0.1 Mrad per hour in order to convert specific components of the decontamination chemical solution (i.e. the organic chemical reagents) into harmless (i.e. nonradioactive) gas phase products such as carbon dioxide or hydrogen. The resulting nonradioactive gas phase products are then continuously removed from the decontamination circuit through the plant's off-gas system as the decontamination chemical solution circulates. The result is that the conversion of the components into nonradioactive gas phase products reduces the amount of ion exchange resin necessary for removal of the organic chemical reagents from the decontamination chemical solution.

In conventional decontamination processes, the organic chemical reagents are usually removed through the use of ion exchange resins. The conversion process of the present invention, however, uses less ion exchange resin for removal of the organic chemical reagents than the amount stoichiometrically required to remove the reagents added.

The presence of chelants in the radioactive waste ion exchange resins can also be avoided during the decontamination process by converting the chelants to gas phase species by radiolysis.

Nitrous oxide gas can also be added to the decontamination chemical solution containing dissolved radioactive deposits to enhance the conversion of specific components of the decontamination chemical solution into nonradioactive gas phase products.

It is an object of the present invention to control the radiolysis behavior during the decontamination process to protect the reagent's function during the decontamination and then to encourage the conversion of the chemicals to the gas phase once the radioactivity removal is complete. Such conversion can be accomplished by controlling the chemical composition of the circulating decontamination solution.

It is another object of the present invention to reduce the concentration of metal ions present in the decontamination chemical solution to enhance the conversion of specific components of the decontamination chemical solution into nonradioactive gas phase products. The metal ions can be reduced by adjusting the flow rate of the decontamination chemical solution through the decontamination chemical solution ion exchange treatment system.

It is still another object of the present invention to maximize the average radiation dose rate experienced by the decontamination chemical solution containing dissolved radioactive deposits. This is achieved by measures such as 1) including the reactor core in the decontamination circuit, and/or 2) by leaving the fuel in place and by conducting the decontamination as soon as possible after reactor shutdown but before the radiation dose rates due to the fuel have been reduced through radioactive decay. Conceivably, an external radiation source could also be provided to increase the radiation dose, although this is unlikely to be required in most cases.

It is desirable to use the plant's own clean-up ion exchange systems to the maximum extent for undertaking the decontamination and to avoid as far as possible, if not completely, the use of additional temporary ion exchange plants. This is accomplished by reducing the amount of resin required by radiolysis, as stated above, and by controlling the decontamination parameters so that the process operates slowly, allowing time for change-out of clean-up resins during the decontamination process.

The present invention also provides for a method for minimizing radioactive waste produced during decontamination processes performed on radioactively contaminated nuclear reactors wherein the decontamination process includes exposing parts of the nuclear reactor's circuit to a LOMI decontamination chemical solution which dissolves radioactive deposits and subsequently treating the LOMI decontamination chemical solution by ion exchange. The method includes introducing the LOMI decontamination chemical solution to a decontamination circuit to dissolve radioactive deposits. The decontamination chemical solution containing the dissolved radioactive deposits is then exposed to ionizing radiation having an average radiation dose rate of at least 0.1 Mrad per hour in order to convert specific components of the decontamination chemical solution into nonradioactive gas phase products. Enhancing the conversion of specific components of the decontamination chemical solution into nonradioactive gas phase products is accomplished by removing metal ions from the spent LOMI decontamination chemical solution. The resulting nonradioactive gas phase products are continuously removed from the decontamination circuit as the LOMI decontamination chemical solution circulates, wherein the conversion of components into nonradioactive gas phase products reduces the amount of ion exchange resin necessary for removal of the organic chemical reagents from the LOMI decontamination chemical solution.

The present invention may in principle be applied with a wide range of decontamination processes such as the CANDEREM (CANada deuterium uranium DEREM) process described in Sperenzini, "Improvements to the CANDEREM process", EPRI Workshop, Jun. 4–5, 1991; and the CAN-DECON (CANada deuterium uranium DECONtamination) process described in P. J. Petit, J. E. LeSurf, W. B. Stewart and S. B. Vaughn, Corrosion '78, Houston Tex., 1978. However, the method of the present invention is particularly applicable to the process described in U.S. Pat. No. 4,705,573 (the "LOMI" process).

DETAILED DESCRIPTION OF THE INVENTION

While describing the present invention and its embodiments, certain terminology will be utilized for the sake of clarity. For example, the decontamination system will be discussed with reference to the LOMI decontamination process despite the fact that it can be applied to a wide range of decontamination processes. It is intended that such terminology include not only the specifically recited embodiments, but all technical equivalents which perform substantially thesame function, in substantially the same manner to achieve substantially the same result. Those skilled in the art will also recognize that certain components described herein can be interchanged with art recognized equivalents. Where appropriate, a description of such equivalents is provided.

For the purpose of this invention to be achieved, the decontamination solution must absorb a certain dose of ionizing radiation, the magnitude of which is dependent on the particular embodiment of the invention applied. More specifically, the average radiation dose rate is dependent principally on the physical configuration of the decontamination system and the length of time between the reactor shut down and the decontamination taking place.

The physical configuration of the decontamination system will depend on factors such as the type of reactor system (e.g., whether the reactor has a pressure tube or a pressure vessel design) and the volume of the decontamination system external to the reactor core. Many of the "full system decontamination with fuel in place" operations, for example in Canada and England, have taken place in pressure tube design reactors. Because the proportion of the decontamination solution volume within the vicinity of the fuel elements is small in such reactors, it would not have been practical to use this invention for such operations.

Reduction of the radiation dose rate from the full elements takes place rapidly within the first ten days after reactor shut down. Therefore, the process of the present invention should be initiated within this period. If this is not possible or practical to perform the method of the present invention during this time period, an external source of radiation dose may be provided.

In designing the decontamination system for use with the present invention, the average radiation dose rate experienced by the decontamination solution is an important parameter. It is assumed that the circulation time of the decontamination solution is rapid in comparison with significant changes in solution concentrations of decontamination chemical species due to radiation effects, and thus that the decontamination solution can be considered to be well mixed. Those skilled in the art of decontamination will have access to calculations of the radiation dose rate at various locations within the reactor core, and the dose rate external to the reactor core can be considered to be zero. From this information, it is possible to calculate the average radiation dose rate experienced by the decontamination solution, by dividing the decontamination solution into x volume elements each subjected to uniform radiation dose rate, and by using the expression:

$$\text{Average Radiation Dose Rate} = \sum_{0}^{x} (R_n \cdot \delta V_n)/V$$

where $R_n$ is the radiation dose rate experienced by the nth element of volume $\delta V^8$ (wherein $\delta$ denotes a small volume of $V_n$).

The primary effect of radiolysis of water is production of the species: OH radical, H radical, aquated electron, hydrogen and hydrogen peroxide. The overall yield of the radical species, or "G value", is about 6 molecules per 100 eV absorbed energy. In the case where all these species cause destruction of the decontamination chemical reagent in a single step the decontamination reagent will be lost at the rate of about 6 millimole per liter per 1 MRad absorbed (1 Mrad=$6.24 \times 10^{22}$ eV per liter). In practice, some of the species may not react with the decontamination reagent, and several radical reactions are likely to be required before the components of the decontamination chemical reagent is converted to a gas phase species. Decontamination reagents are typically used at a concentration between about 1 millimole per liter and 10 millimole per liter, and thus 10 MRad (order of magnitude) is likely to be the minimum dose absorbed at which useful radiolytic effects can be achieved. The absorbed dose is the product of the average dose rate experienced by the decontamination solution and the time taken, and the objective can therefore be accomplished at a low dose rate if sufficient time is allowed. In order to use this invention, the decontamination system must be designed to have the maximum possible average dose rate, and for practical purposes the invention can only be used if the average dose rate to the decontamination solution is in excess of about 0.1 MRad per hour. Typically, the dose rate should be an order of magnitude greater than this.

The principle by which the radiolysis of the decontamination chemical solution can affect the amount of radioactive waste generated is that decontamination chemicals are converted to gas phase species. This allows the chemicals to be efficiently separated from the radioactivity present, and to be released as harmless non-radioactive waste gases. It is essential for the present invention that the gases so formed are continuously separated and removed from the circulating solution, otherwise the radical reactions with the circulating dissolved gases can create a dynamic equilibrium in which no further destruction of chemicals takes place.

Added gases or other chemicals can be used to control the radiolysis behavior. These species react with the primary radicals by reactions well established in the industry. Pure water radiolysis yields approximately equal numbers of oxidizing and reducing radicals. Conversion of organic chemicals to the gas phase is primarily an oxidative process, and oxidation can be encouraged by using an added chemical to convert reducing radicals to oxidative ones. An example of this is nitrous oxide gas, which converts the aquated electrons (a reducing species) into hydroxyl radicals (an oxidizing species) by the following reaction:

$$e_{aq}^- + N_2O + H^+ \rightarrow N_2 + OH$$

On the other hand, oxidizing hydroxyl radicals can be converted to reducing carbon dioxide radical anions by reaction with formate ion as follows:

$$HCOO^- + OH \rightarrow H_2O + CO_2^-$$

Addition of chemical species such as formic acid or nitrous oxide can therefore be used to affect the radiolysis at different times during the decontamination.

The other factor controlling radiolysis is the presence of metal ions in the solution. Certain metal ions, either solvated by water or bound by a chelating agent, can react with the radical species to convert them to stable ones. An example of this, which is known in the industry, is the reaction of the spent reagent vanadic picolinate with carbon dioxide radical anions to produce the active reagent vanadous picolinate according to the reaction:

$$V(pic)_3 + CO_2^- ===> V(Pic)_3^- + CO_2$$

The vanadous picolinate can also react with oxidizing radicals to produce vanadic picolinate. In this way, the presence of vanadium in the decontamination releases the chemical energy of the radical species and in so doing protects the organic components of the reagent (picolinic acid) against damage. Similar reactions can take place with iron ions.

The presence of metal ions in the decontamination solution can be controlled by adjusting the flow rate of the decontamination solution through the ion exchange clean-up system. Slowing down the rate of ion exchange purification will increase the concentration of metal ions and reduce the radiolytic chemical modification of the organic reagents. Conversely, increasing the rate of ion exchange purification will reduce the metal ion concentration and increase the radiolytic reactions with the organic reagents.

It is established that the majority of metal ions can be removed by ion exchange in decontamination without removing the chemicals at the same time. This is accomplished by using cation exchange only, since the majority of the metal ion species are cationic while the chemicals are anionic. The chemicals are normal removed at the of the decontamination process by anion exchange. However, in the present invention this anion exchange is unnecessary, since the radiolysis converts the chemicals to gas phase species. Some anion exchange or mixed bed (anion and cation exchange combined) may, however, be required at the end to remove traces of inorganic or metallic species, and to effect final clean-up. Nitrogen atoms present in the organic chemical species may be converted by radiolysis to ammonia, but if this is the case the ammonia will be removed from the system in the form of ammonium ions by the cation exchange process.

The radiolytic reactions involved in the present invention may be very complicated, but need not be fully understood for the invention to be applied. The main principle is that to preserve the decontamination reagent, high concentrations of metal ions having more than one stable oxidation state should be present. Furthermore, chemical additions should be made to make up lost reagents and increase the proportion of reducing radicals. Finally, the decontamination system can be used without dis-entraining dissolved gases in order to achieve dynamic equilibrium.

To remove the decontamination chemicals, gas dis-entrainment should take place. Gas-dis-entrainment is a process for separating entrained gases from the liquid phase. This can be assisted by the passage of bubbles through the solution or can be achieved by allowing the gas bubbles to rise to the surface and escape. Reducing the pressure of the solution will help to achieve full gas entrainment. Metal ions can and should be removed by increasing cation exchange purification rates. Chemical additions should be made to increase the proportion of oxidizing radicals.

In the operation of nuclear reactors, ion exchange equipment is usually available within the operating coolant system for chemical control of the reactor coolant during operation. Examples of such equipment are the "Reactor Water Clean Up Unit" of the Boiling Water Reactor Design or the resins in the Chemical and Volume Control System of the Pressurized Water Reactor Design. Normally the capacity of such plants is far too small to undertake clean up of a decontamination solution, and it is standard practice in decontamination applications to provide additional temporary ion exchange plants. Unfortunately, the connection of such a temporary plant to the system is often inconvenient and is particularly difficult to achieve in the very early stages of a maintenance outage (before the reactor vessel head has been removed) when the present invention is best used. Therefore, the reactor's own ion exchange equipment can be used during such a period, and its effective capacity can be increased by changing the resins frequently during the decontamination process. For such an operation to be practical, however, the decontamination process must take place gradually. Those skilled in the art of decontamination will be aware of the process parameters which control the rate at which radioactive deposits are dissolved, and will therefore be able to control the rate of decontamination to be consistent with the rate at which metal ions can be removed by the ion exchange plant. Such a gradual, continual removal of radioactivity will also have the advantage of reducing the inventory of radioactive material circulating at any one time, thereby improving the safety of the operation.

EXAMPLE #1

The following example describes how the present invention can be used to undertake a full system decontamination of a boiling water reactor with the LOMI process, as described in U.S. patent application Nos. 4,731,124 and 4,705,573, herein incorporated by reference. The parameters can be adjusted as required and the purpose of this calculation is merely to illustrate how the various stages of the process would operate. It is assumed that the system volume is 400 $m^3$ and the total inventory of oxide deposit is 500 kg of iron in the form of iron oxide. The average radiation dose is taken as 0.5 Megarads per hour made up from 6% of the solution being in the reactor core at any one time at a dose rate 8 Megarads per hour.

The first step of the decontamination is that an injection is made to the system of 295 kg of picolinic acid and 10 kg of vanadium as vanadous format solution, together with the appropriate amount of sodium hydroxide (approximately 20 kg) to adjust the pH to the required range. This gives a concentration of 0.5 mM vanadium and 6 mM picolinic acid. The reactor coolant is circulated through a cation exchange resin clean up system at the rate of 1700 gallons per minute. This clean up rate corresponds to treatment of one system volume per hour (a lower rate such as one system volume every two hours might be acceptable).

After the initial injection of the vanadous formate solution is added at the rate of 10 kg of vanadium per hour plus sodium hydroxide as required to maintain the pH. No further picolinic acid is added. Additional formic acid is added as required to make up for the loss due to radiolysis, but the net additional amount required will be the total amount required less that present in the vanadous formate reagent. The total requirement, for formate/formic acid, assuming a "G" value for this loss of 7 (per 100 eV), will be 67 kg per hour.

Iron will be dissolved by virtue of the vanadous ions added and by vanadous ions generated by radiolysis. If the "G" value for radiolytic generation is 3, appropriate to a standing concentration of formate of 10 mM, the dissolution of iron due to radiolytically generated vanadium will be 35 kg per hour, and the iron dissolved due to added vanadium will be 11 kg per hour. The standing concentrations of the various species will be as follows:

Vanadium=$0.5 \times 10^{-3}$ Mole per liter

Iron=$2 \times 10^{-3}$ Mole per liter

Picolinic Acid=$6 \times 10^{-3}$ Mole per liter

Formic Acid=$10 \times 10^{-3}$ Mole per liter

At the end of decontamination (oxide dissolution will take about 12 hours at the above rate) no further vanadous formate is added, but cation exchange clean-up is continued. The circulating solution is sparged with a suitable gas (air, nitrogen or nitrous oxide) and the off gas is vented through a HEPA filter. If the "G" value for picolinic acid destruction is 0.5, the time for destruction of the picolinic acid will be approximately 24 hours. After the picolinic acid has been destroyed, final polishing of the water will by mixed bed ion exchange could take place.

The total amount of ion exchange resin waste generated by the above procedure assuming removal of 500 kg of iron in the deposit, is approximately 550 cu ft.

What is claimed is:

1. A method for minimizing radioactive waste produced during decontamination processes performed on radioactively contaminated nuclear reactors, the method comprising the steps of:

a) introducing a decontamination chemical solution to a decontamination circuit to dissolve radioactive deposits;

b) exposing the decontamination chemical solution containing dissolved radioactive deposits to ionizing radiation having an average radiation dose rate of at least 0.1 Mrad per hour in order to convert specific components of the decontamination chemical solution into nonradioactive gas phase products; and c) removing the resulting nonradioactive gas phase products from the decontamination circuit as the decontamination chemical solution circulates, wherein the conversion of components into gas phase products reduces the amount of ion exchange resin necessary for removal of organic chemical reagents present in the decontamination chemical solution.

2. The method of claim 1 wherein the decontamination chemical solution is a Low Oxidation-state Metal Ion (LOMI) solution.

3. The method of claim 1 wherein the decontamination solution is a CANada deuterium uranium DEREM (CAN-DEREM) solution.

4. The method of claim 1 wherein the decontamination solution is a CANada deuterium uranium DECONtamination (CAN-DECON) solution.

5. The method of claim 1 wherein the removing step further comprises the steps of (i) removing the nonradioactive gas phase products from the decontamination chemical solution through gas dis-entrainment and (ii) venting the nonradioactive gas phase products from the decontamination circuit through an off-gas system.

6. The method of claim 1 further comprising the step of adding nitrous oxide gas to the decontamination chemical solution containing dissolved radioactive deposits for enhancing the conversion of specific components of the decontamination chemical solution into nonradioactive gas phase products.

7. The method of claim 1 further comprising the step of reducing metal ions in the decontamination chemical solution for enhancing the conversion of specific components of the decontamination chemical solution into nonradioactive gas phase products.

8. The method of claim 7 wherein the step of reducing metal ions comprises adjusting the flow rate of the decontamination chemical solution through a decontamination chemical solution ion exchange treatment system.

9. The method of claim 1 wherein the decontamination circuit includes the nuclear reactor.

10. The method of claim 1 wherein the decontamination chemical solution is introduced to the circuit while the reactor fuel is in place.

11. The method of claim 1 wherein the method for minimizing radioactive waste is conducted as soon as possible after shut-down of the reactor to be decontaminated.

12. A method for minimizing radioactive waste produced during decontamination processes performed on radioactively contaminated nuclear reactors, the method comprising the steps of:

a) introducing a Low Oxidation-state Metal Ion (LOMI) decontamination chemical solution to a decontamination circuit to dissolve radioactive deposits;

b) exposing the LOMI decontamination chemical solution containing dissolved radioactive deposits to ionizing radiation having an average radiation dose rate of at least 0.1 Mrad per hour in order to convert specific components of the decontamination chemical solution into nonradioactive gas phase products;

c) reducing metal ions in the LOMI decontamination chemical solution for enhancing the conversion of specific components of the decontamination chemical solution into nonradioactive gas phase products; and d) removing the resulting nonradioactive gas phase products from the decontamination circuit as the LOMI decontamination chemical solution circulates, wherein the conversion of components into gas phase products reduces the amount of ion exchange resin necessary for removal of organic chemical reagents present in the LOMI decontamination chemical solution.

13. The method of claim 12 wherein the step of reducing metal ions comprises the step of adjusting the flow rate of the decontamination chemical solution through a decontamination chemical solution ion exchange treatment system.

14. The method of claim 12 wherein the exposing step further comprises maximizing the average radiation dose rate experienced by the decontamination chemical solution containing dissolved radioactive deposits.

15. The method of claim 12 wherein the removing step further comprises the steps of (i) removing the nonradioactive gas phase products from the decontamination chemical solution through gas dis-entrainment and (ii) venting the nonradioactive gas phase products from the decontamination circuit through an off-gas system.

* * * * *

UNITED STATES PATENT AND TRADEMARK OFFICE
CERTIFICATE OF CORRECTION

PATENT NO. : 5,901,368
DATED : May 4, 1999
INVENTOR(S) : Wood, et al.

It is certified that error appears in the above-identified patent and that said Letters Patent is hereby corrected as shown below:

Column 5, Line 44: after "from the" the word "full" should be -- fuel --

Column 6, Line 6: after "volume" the symbol "$\delta V^8$" should be -- $\delta V_n$ -- .

Signed and Sealed this

Fifteenth Day of February, 2000

Attest:

Q. TODD DICKINSON

*Attesting Officer*

*Commissioner of Patents and Trademarks*